United States Patent Office 3,557,233
Patented Jan. 19, 1971

3,557,233
AROMATIC HYDROCARBONS SUBSTITUTED BY PHENYLETHYNYL GROUPS
Arnold Zweig, Westport, and Donald Roy Maulding, Stamford, Conn., assignors to American Cyanamid Company, Stamford, Conn., a corporation of Maine
No Drawing. Filed Mar. 14, 1968, Ser. No. 712,922
Int. Cl. C07c 5/12
U.S. Cl. 260—668                1 Claim

ABSTRACT OF THE DISCLOSURE

This invention relates to a chemiluminescent system to obtain chemiluminescent light by reacting an oxalic-type compound of the group consisting of (a) an oxalic-type anhydride, (b) an oxalic-type amide, (c) an oxalic-type O-acylhydroxylamine, and (d) an oxalic-type ester with a hydroperoxide compound in the presence of a solvent and a phenylethynyl-substituted aromatic compound as a fluorescer.

---

This invention relates to a novel chemiluminescent system and to a combination of ingredients which when reacted with a hydroperoxide obtain a quantum yield, a maximum intensity, and a total yield of chemiluminescent light which are of a significantly greater degree than chemiluminescent processes employing prior chemiluminescent compositions. By "chemiluminescent light" as referred to herein is meant electromagnetic radiation at wavelengths falling between about 330 m$\mu$ and about 1,000 m$\mu$.

The invention more particularly relates to the employment of particular fluorescent compounds, phenylethynyl substituted aromatic hydrocarbons, in combination with specifically an oxalic-type compound to obtain chemiluminescent light.

In the earlier stages of chemiluminescence research the low efficiency and the low maximum intensity of light obtainable from even the best of the known chemiluminesent systems was of such a poor quality. i.e., such a small illumination, that the advantage or superiority of one fluorescent compound over other possible fluorescent compounds was not significant in terms of the illumination obtained by the use thereof. For example, the better fluorescent compounds differed from the poorer fluoroscent compounds merely by a matter of about 3 or 4 units in quantum yield. Similarly, except to the extent that a chemiluminescent material was soluble in a diluent at least to the extent of obtaining chemiluminescent light upon the reaction with an appropriate peroxide compound, there was no recognition of any appreciable or significant superiority of any one particular solvent over other solvents known to be suitable in chemiluminescent systems in general. Even as some improvements developed in the chemiluminescent materials themselves, there still existed problems as to which solvents could be employed with particular chemiluminescent materials, and the fact that only by experimentation could it inconclusively be ascertained that certain combinations were compatible. Also, among the various fluorescent compounds known to be effective in chemiluminescent reaction, there became available conflicting evidence as to the probable superiority of one fluorescent compound over another. Additionally, the particular nature of the chemiluminescent agent to be employed, as well as the particular nature of the fluorescent compound to be employed, respectively, each may vary in solubility in the particular solvent to be employed, thereby further complicating any effect to predict the superiority of any projected combination of chemiluminescent ingredients.

It is an object of this invention to obtain a chemiluminescent composition which obtains a higher quantum yield of light when admixed with a hydroperoxide.

Another object of this invention is to obtain a process for the production of chemiluminescent light at a higher quantum yield.

Another object of this invention is to obtain an article of manufacture suitable for storage of the chemiluminescent composition and/or employment with the chemiluminescent composition in a chemiluminescent reaction.

Another object is to provide a chemiluminescent composition or system having a fluorescent compound which may be used at a higher concentration.

Another object of this invention is to obtain a chemiluminescent composition which when admixed with a hydroperoxide obtains a higher maximum intensity of light.

Another object of this invention is to obtain a process which produces a chemiluminescent light of a higher maximum intensity.

Another object is to obtain a chemiluminescent composition which obtains a higher total light yield.

Another object is to obtain a process for the production of a higher total quantity of light.

A further object is to provide a method for shifting the spectral emission range of a fluorescent compound.

These and other objects of my invention will become apparent as the description thereof proceeds.

The term "chemiluminescent composition," as used herein, means a mixture which will result in chemiluminescence.

A chemiluminescent reactant is any compound which enters into a chemical reaction whereby chemiluminescent light is obtained.

The term "chemiluminescent reaction component," as used herein, means a mixture which will result in a chemiluminescent reaction (1) when reacted with other necessary reactants in the processes as disclosed herein or (2) when brought into the proper physical environment.

The term "fluorescent compound," as used herein, means a compound which fluoresces in a chemiluminescent reaction, or a compound which produces a fluorescent compound in a chemiluminescent reaction.

The term "admixing," as used herein, means "reacting" or sufficiently bringing together component reactants to obtain a chemiluminescent reaction.

The term "hydrogen peroxide compound" includes (1) hydrogen peroxide and (2) hydrogen peroxide-producing compounds.

The term "hydroperoxide compound" as used herein is limited to peroxide compounds having at least one "HOO—" group, or a compound which upon reaction produces a compound with such a group.

The term "peroxide compound" as used herein, also includes compounds which upon reaction produce the peroxide group.

The term "diluent," as used herein, means a solvent or a vehicle which when employed with a solvent does not cause insolubility.

The objects of chemiluminescence have been obtained by the reaction of the hydroperoxide with a chemiluminescent composition which, in combination, comprises a chemiluminescent compound selected from the group consisting of (1) an oxalic-type anhydride of the type disclosed and claimed in copending application, U.S. Ser. No. 425,599, abandoned Oct. 25, 1965, continuation-in-part filed as U.S. Ser. No. 485,920, filed Sept. 8, 1965, now U.S. Pat. 3,399,137, which is hereby incorporated by reference (2) an oxalic-type amide of the type disclosed and claimed in the copending applications, U.S. Ser. No. 520,052, filed Jan. 12, 1966, now U.S. Pat.

3,442,815, and U.S. Ser. No. 547,782, filed May 5, 1966, now abandoned, which are hereby incorporated by reference, (3) an oxalic-type O-acrylhydroxylamine of the type disclosed and claimed in copending application Ser. No. 547,761, filed May 5, 1967, now abandoned and (4) an oxalic-type ester, a fluorescent type compound, and a suitable solvent.

The general mechanism for the chemiluminescent reaction can be broken down into three steps.

(1) Luminant+Oxidant→Key Intermediate
(2) Key Intermediate+Fluorescer→Excited Singlet Fluorescer
(3) Excited Singlet Fluorescer→Fluorescer+Radiation In step (1) a chemiluminescent material undergoes reaction, usually with an oxidant, to produce what will be called a key intermediate. In step (2) the key intermediate undergoes a decomposition or other reaction which produces a fluorescent compound in a singlet excited state. In step (3) the excited singlet fluorescer emits radiation. The decomposition products are not shown. The exact nature of the key intermediate has not been determined. Theoretically, the fluorescent compound is only electronically excited by an energy transfer of the chemical energy released by the decomposition of the key intermediate and should not itself be decomposed. However, it has been found that fluorescent compounds actually undergo decomposition also in all known examples. Thus, since the fluorescer is necessary as the light emitter, when all of it has decomposed, no further illumination is possible even though decomposition of all of the key intermediate may not have occurred. Thus, it is essential for maximum utilization of all of the chemical energy from step (2) that sufficient fluorescer be present. This is, however, limited by the solubility of the fluorescer in the solvent system and the fluorescer stability. Although highly efficient fluorescers are known, a highly efficient fluorescer with high solubility and stability has not been found heretofore. Thus, the fluorescer has been the limiting factor in the chemiluminescent reaction described above, since it has not been possible to dissolve a sufficient amount of any highly efficient fluorescer in the system to utilize to the maximum possible the chemical energy released.

We have now unexpectedly found that the above objects are attained by the use of phenylethynyl-substituted aromatic compounds and that these compounds are highly efficient fluorescers which are highly soluble in the solvent system of the chemiluminescent reaction.

These compounds may therefore be present in a greater concentration and thus be present in sufficient amount to insure utilization to the maximum possible extent of the chemical energy released in the chemiluminescent process.

We have found that fluorescers which normally emit in the visible region can be made to emit at longer wavelengths and with greater efficiency by substitution with phenylethynyl groups. Such fluorescers give improved performance and improved stability in chemiluminescent systems.

Substitution of phenylethynyl groups on aromatic hydrocarbons at positions where the phenylethynyl groups can participate in conjugation (the meso position in acenes) gives large shifts to longer wavelengths in the fluorescence of molecules with increased efficiency.

The shifts to longer wavelengths produced by the phenylethynyl groups in the meso positions of acenes are considerably larger than with other substituents such as halo, hydroxy, alkoxy, cyano, nitro, alkyl, aryl, and the like. In addition, the increase in fluorescence efficiency is greater with phenylethynyl groups.

In the case of anthracene, for example, medium-weak blue fluorescence is observed. With 9,10-bis(phenylethynyl)anthracene, a strong yellow-green fluorescence is obtained.

Besides the acenes, other alternate aromatic hydrocarbons can be included, such as naphthalene, phenanthrene, benzanthracene, chrysene, pyrene, perylene, benzpyrenes, etc.

The phenylethynyl-substituted aromatic hydrocarbons may also be substituted with such substituents as hydroxy, alkoxy, halo, dialkylamino, diarylamino, alkyl, aryl, cyano, nitro, etc. These groups may be substituted directly on the parent aromatic hydrocarbon or on phenyl of the phenylethynyl group.

Examples are as follows in which R— is the phenylethynyl group:

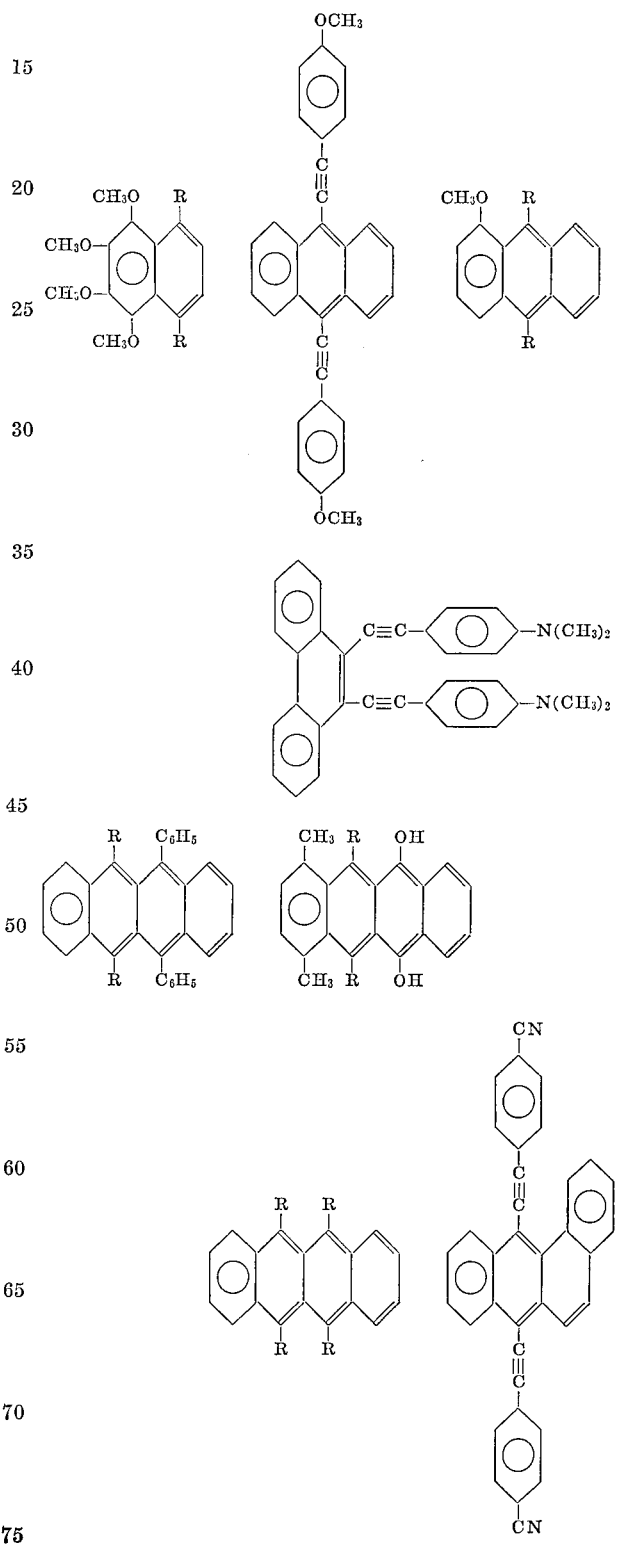

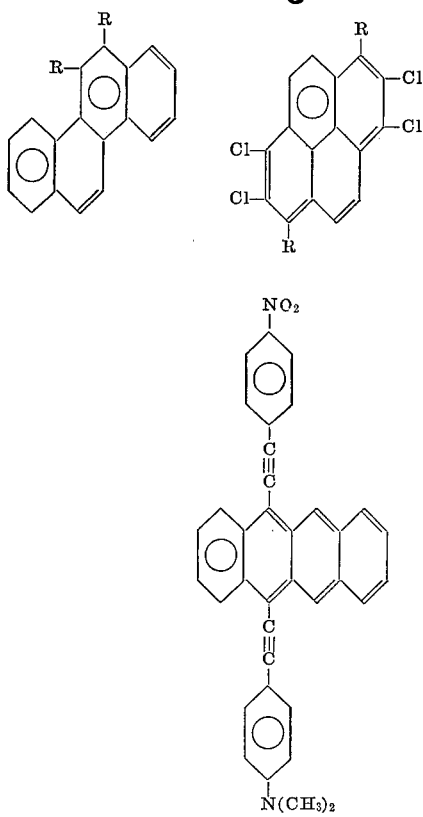

Numerous well-known aromatic fluorescers may be substituted and such fluorescers are described in the following publications:

(a) I. B. Berlman, "Handbook of Fluorescence Spectra of Aromatic Molecules," Academic Press, N.Y., 1965.
(b) E. Clar, "Polycyclic Hydrocarbons," vol. I and II, Academic Press, N.Y., 1964.
(c) M. Furst, H. Kallman and F. H. Brown, J. Chem. Phys., 26, 1327 (1957). (The fluorescence efficiencies of over 300 compounds are given.)

Thus, when the phenylethynyl anthracene-type compound of the novel combination of this invention is 9,10-bis(phenylethynyl)anthracene, it may be any substituted form thereof, such as with (a) alkyl substituents contained from about one to about eight carbon atoms, (b) chlorine, (c) fluorine, (d) carboxy, (f) alkoxy, (g) aryloxy, and (h) aryl, for example.

In the following representative structural formula of 9,10-bis(phenylethynyl)anthracene, the positions suitable for substitution have been numbered in the conventional way from 1 to 10 on the anthracene nucleus to illustrate that the phenylethynyl anthracene may be substituted at any one or more of these positions by a substituent such as those listed above.

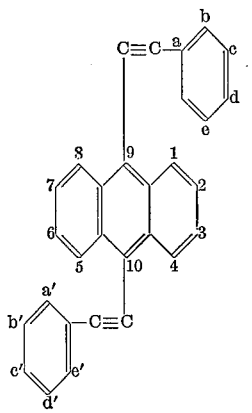

The preferred phenylethynyl anthracene-type compound is 9,10-bis(phenylethynyl)anthracene, shown above.

Phenylethynyl-substituted hydrocarbons can therefore be used to increase fluorescence efficiency and color flexibility in fluorescent systems. The addition of phenylethynyl groups to the acenes increased their stability in oxalate-peroxide chemiluminescent systems.

The phenylethynyl-substituted aromatic compounds may be made from known aromatic fluorescents by the reaction of aromatic quinones with lithium phenylacetylide and subsequent reduction of the diol with stannous chloride. The reaction is described by W. Reid, Neuere Methoden der Preparativen Organischen Chemie, Band IV, Verlag Chemie, G.m.b.H., Weinheim/Bergstrasse, 1966, page 88. The general reaction scheme is as follows, where R is a phenyl group:

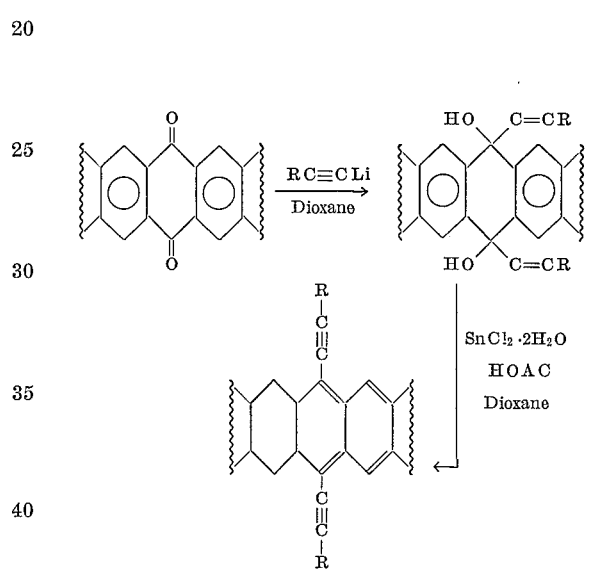

The typical solvents employable as a necessary ingredient for a chemiluminescent process employing the chemiluminescent combination of this invention include the conventional simple-ester solvents such as dimethyl phthalate, dibutyl phthalate, ethyl acetate, octyl acetate, dimethyl adipate, triethyl phosphate, tricresyl phosphate, ether-ester solvents such as 2-methoxyethyl acetate, and the ether solvents such as 1,2-dimethoxyethane, ethylene carbonate, 1,2-dibutoxyethane (i.e. dibutylcellosolve), propylene carbonates, and dibutyl carbitol. Typical ether solvents include tetrahydrofuran, and dioxane. It should be noted that there are other solvents which are non-ether-ester which also may be employed; such as benzene, xylene, toluene, chlorobenzene, tetrachloroethane, fluorocarbons, polychlorinated polyphenyls and the like. Mixtures of these solvents may also be used. These specific examples are merely listed as illustrative specific compounds.

In addition to having greater solubility in the above solvents, the phenylethynyl-substituted fluorescer compounds are also more economical than other highly efficient fluorescers. The preferred combination of this invention employs an oxalic-type ester as the essential chemiluminescent ingredient of the novel combination of this invention, and accordingly the entire disclosure of copending application Ser. No. 619,140, filed Feb. 28, 1967, is hereby incorporated by reference. Therefore oxalic-type esters within the scope of this invention include ester of the following representative formula:

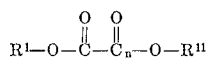

where $R^1$ or $R^{11}$ is an alkyl group such as hexafluoro-2-propylaryl substituents such as phenyl-, or naphthyl-for example, or substituted aryl groups such as chlorophenyl-, trifluoromethylphenyl-, formylphenyl-, nitrophenyl-, methoxyphenyl-, dinitrophenyl-, pyridylphenyl-, sulfophenyl-, heterocyclic groups such as pyridyl-, or substituted forms of heterocyclic groups such as methylpyridyl, chloropyridyl, acytoxypyridyl-, formylpyridyl-, carboxypyridyl-, methoxyfuryl-, dimethylaminotetrahydrofuryl-, sulfofuryl-, for example, and unsaturated alkyl groups such as vinyl-, for example.

Once the unexpected superiority was discovered for the combination of this invention which includes the oxalic-type ester chemiluminescent compound, it immediately became apparent to the inventor that because of similarity in the chemistry mechanism of reactions, the oxalic-type anhydrides, the oxalic-type amides, and the oxalic-type O-acylhydroxylamines of the types set forth in the above cited copending applications incorporated by reference may be employed in substitution for the preferred oxalic-type ester.

The oxalic-type ester of this invention is preferably selected from the group consisting of (a) an ester of oxalic-type acid and an alcohol characterized by acid ionization constant in water greater than $1.3 \times 10^{-10}$, and (b) a vinyl ester of an oxalic-type acid. Similarly, in a preferred embodiment thereof, the alcohol would be an aromatic alcohol substituted by a substituent characterized by a positive Hammett sigma value. The preferred species of oxalic-type esters include bis(substituted-phenyl)oxalate such as bis(2-nitrophenyl)oxalate, bis(2,4-dinitrophenyl)oxalate, bis(2,6-dichloro - 4 - nitrophenyl)oxalate, bis(3-trifluoromethyl-4-nitrophenyl)oxalate, bis(2-methyl-4,6-dinitrophenyl)oxalate, bis(1,2-dimethyl-4,6-dinitrophenyl)oxalate, bis(2,4-dichlorophenyl)oxalate, bis(2,5-dinitrophenyl)oxalate, bis(2-formyl - 4 - nitrophenyl)oxalate, bis(pentachlorophenyl)oxalate, bis(1,2 - dihydro-2-oxo-1-pyridyl)glyoxal, bis-N-phthalmidyl oxalate. The preferred sub-species is bis(2,4,6-trichlorophenyl)oxalate.

The peroxide employed in the compositions and process of this invention may be obtained from any suitable peroxide compound. For example, the peroxide may be employed as sodium peroxide. Alternatively, sodium perborate may be placed in aqueous solution whereby a solution of hydrogen peroxide is obtained. Obviously, hydrogen peroxide or its solution may be employed, and this is the preferred peroxide compound. Although the presence of water and/or base is critical in order to obtain the preferred optimum maximum-intensity chemiluminescence in certain embodiments of this invention, the peroxide employed may be obtained from anhydrous hydrogen peroxide compounds such as perhydrate of urea (urea peroxide), perhydrate of pyrophosphate (sodium pyrophosphate peroxide), perhydrate of histidine (histidine peroxide), sodium perborate, and the like. Still another form in which the anhydrous $H_2O_2$ may be provided in the composition is that of an anhydrous solution of $H_2O_2$ in a suitable solvent such as an ether, an ester, an aromatic hydrocarbon, etc., of the type which would provide a suitable diluent for the composition of this invention. Whenever hydrogen peroxide is contemplated to be employed, any suitable compound may be substituted which will produce hydrogen peroxide.

The peroxide concentration may range from about 15 molar down to about $10^{-5}$, preferably about 2 molar down to about $10^{-2}$ molar. The ester of this invention may be added as a solid or in admixture with a suitable solid peroxide reactant or in a suitable diluent, or alternatively dissolved directly in a solution containing the peroxide reactant.

Typical diluents which additionally may be used in conjunction with the necessary diluent of this invention are those which do not readily react with a peroxide such as hydrogen peroxide, and which do not react with an ester of oxalic acid.

Although the addition of water is not necessary for the production of chemiluminescent light in certain embodiments according to the present invention water can serve as the diluent or partial diluent. The term "water," as used herein, includes water-producing compounds such as hydrate. In addition, however, either one or more diluents may be included with or in the place of water, as long as the peroxide employed is at least partially soluble in the combination of diluents(s), such as for example, at least one-tenth gram of $H_2O_2$ per liter of diluent. The following are illustrative of the additional diluents or solvents which may be employed: non-cyclic or cyclic ethers, such as diethyl ether, diamyl ether, diphenyl ether, anisole, tetrahydrofuran, dioxane, and the like; esters such as ethyl acetate, propyl formate, amyl acetate, dimethyl phthalate, diethyl phthalate, methyl benzoate, and the like; aromatic hydrocarbons, such as benzene, xylene, toluene, and the like.

Although it is only necessary to use phenylethynyl-type fluorescer compounds in the novel combination of this invention, other fluorescent compounds may be employed therewith, if desired, for example to change the color of emission.

The compounds contemplated herein, which may, if desired, be employed in conjunction with the phenylethynyl-type compound, may be defined broadly as those which do not readily react on contact with the peroxide employed in this invention, such as hydrogen peroxide; likewise, they do not readily react on contact with the ester of oxalic acid. Typical additional suitable fluorescent compounds for use in the present invention are those which have a spectral emission falling between 330 millimicrons and 1,000 millimicrons and which are at least partially soluble in any of the above diluents, if such diluent is employed. Among these are the conjugated polycyclic aromatic compounds having at least 3 fused rings, such as: anthracene, substituted anthracene, benzanthracene, phenanthrene, substituted phenanthrene, naphthacene, substituted pentacene, and the like. Typical substituents for all of these are phenyl, lower alkyl, chlorine, bromine, cyano, alkoxy ($C_1$-$C_{16}$), and other like substituents which do not interfere with the light-generating reaction contemplated herein.

Numerous other fluorescent compounds having the properties given hereinabove are well known in the art. Many of these are fully described in "Fluorescence and Phosphorescence," by Peter Pringsheim, Interscience Publishers, Inc., New York, N.Y., 1949. Other fluorescers are described in "The Colour Index," Second edition, volume 2, The American Association of Textile Chemists and Colorists, 1956, pp. 2907–2923. Additional fluorescers are described in the publications of Berlman, Clar and Furst et al. previously mentioned. While only typical fluorescent compounds are listed hereinabove, the person skilled in the art is fully aware of the fact that this invention is not so restricted and that numerous other fluorescent compounds having similar properties are contemplated for use herein.

It should be noted, however, that although the phenylethynyl-substituted-type fluorescent compound is necessary to obtain the production of light of this invention, the fluorescent compound is not necessary to obtain a chemical reaction and chemical energy release. Also, a fluorescent ester amide or anhydride such as the oxalic acid ester of 2-naphthol-3,6,8-trisulfonic acid may be employed as the oxalic-type ester in conjunction with the ethynylanthracene-type compound to obtain the light of this invention. Other typical fluorescent oxalic acid esters include esters of oxalic acid (1) 2-carboxyphenol, (2) 2-carboxy-6-hydroxyphenol, (3) 1,4-dihydroxy-9,10-diphenylanthracene, and (4) 2-naphthol. Thus, a reactant including a fluorescent oxalic-type ester would thereby include at least one fluorescent compound.

It has been found that the molar (moles per liter of diluent) concentrations of the major components of the novel composition herein described may vary considerably. It is only necessary that components be in sufficient concentration to obtain chemiluminescence. The anhydride, amide or ester of oxalic acid molar concentration normally is in the range of at least about $10^{-7}$ to 5 molar, preferably in the range of at least $10^{-3}$ to about 1 molar; the fluorescent compound is present in the range from about $10^{-5}$ to 5, preferably $10^{-4}$ and $10^{-1}$ molar; and the water or other diluent must be present in a sufficient amount to form at least a partial solution of the reactants involved in the chemiluminescent reaction. Although there is no known maximum limit on the concentration of oxalate employed in the reaction, the reaction has been found to be more efficient within the indicated range. The ester may serve as either the sole diluent or a partial diluent.

The ingredients of the composition of this invention, may be admixed in a single stage of admixing or in a sequence of steps of admixing the separate ingredients.

Although in the process of obtaining chemiluminescent light according to this invention, it is normally not necessary to employ a specific order of sequence of steps in the adding of the individual ingredients of the inventive chemiluminescent composition, it has been found that the fluorescent component preferably should be already in the reaction mixture at the time of addition of the last component necessary to bring about the chemical reaction and the concurrent release of chemical energy.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction.

Additionally, it has been found that the superior intensity of chemiluminescence is obtained when the final mixture producing the luminescence is maintained at a temperature of between about $-40°$ C. and $75°$ C., preferably between about $0°$ C. and $50°$ C. However, temperature is not critical and the luminescence of applicant's process is not limited to these ranges.

Additionally, the composition and the process which obtains preferred optimum chemiluminescent light intensity employs a base in an amount sufficient to produce a basic pH. However, the preferred extended lifetime is obtained under about neutral conditions. Any suitable base which does not interfere with the chemiluminescent composition and process of this invention may be employed.

A wide variety of organic and inorganic bases is contemplated, typical bases being: sodium hydroxide, potassium tertiary butoxide, sodium ethoxide, sodium methoxide, ammonium hydroxide, tetrabutyl ammonium hydroxide, and triphenyl methide; Lewis bases, including pyridine, triethylamine, quinoline, and the like; etc.

The composition and the process which obtains chemiluminescent light may optionally employ an acid in an amount sufficient to produce an acidic pH. However, the presence of acid is not essential to obtain chemiluminescence, except with compounds of copending U.S. Ser. No. 547,782, filed May 5, 1966.

The lifetime and the intensity of the chemiluminescent light can be regulated by the use of certain regulators such as:

(1) By the addition of base to the chemiluminescent composition. Both the strength and the concentration of the base are critical for purposes of regulation.

(2) By the variation of hydroperoxide. Both the type and the concentration of hydroperoxide are critical for the purposes of regulation.

(3) By the addition of water.

(4) By the addition of a catalyst which changes the rate of reaction of hydroperoxide with the oxalic-type ester. Catalysts which accomplish that objective include those described in M. L. Bender, "Chem. Revs.," vol. 60, p. 53 (1960). Also, catalysts which alter the rate of reaction or the rate of chemiluminescence include those accelerators of copending application, Ser. No. 577,595, filed Sept. 7, 1966, now abandoned, and decelerators of copending application, Ser. No. 577,615, abandoned Sept. 13, 1967, continuation-in-part filed June 26, 1967, as Ser. No. 648,932.

More specifically, the advantages obtained by the corporation of a catalyst of Ser. No. 577,595 may be obtained in conjunction with the objects of this present invention, by employing, according to the copending application, an ionized salt having a cation selected from (a) an organic quaternary cation selected from the group consisting of ammonium, arsenic, and phosphorous, and (b) alkali metal having an atomic weight above about 22, the salt of said cation preferably being soluble in an organic solvent and preferably being characterized by a property of forming cation-aggregates when reacted with the oxalic-type ester and a hydroperoxide. One of the advantages is the fact that an excessive amount of the chemiluminescent agent may be employed whereby a higher quantum yield may be obtained when the ionized salt is employed, in contrast to systems not employing the accelerator whereby such systems would be limited to a much lower maximum concentration of chemiluminescent agent which would continue to increase rather than decrease the total quantum yield of chemiluminescent light.

Similarly, within the scope of the present invention is the concurrent employment of one or more decelerators either alone in the composition of this invention, or in conjunction with one or more of the accelerators discussed in the preceding paragraphs. By employing one of the accelerators of the preceding paragraph, it would be possible to employ a greater total concentration of the chemiluminescent agent, while concurrently it would be possible to employ a decelerator which would prolong the period during which the light of high intensity is obtained from the chemiluminescent reaction. Such decelerators set forth in the copending application, Ser. No. 577,615, include for example a compound such as oxalic acid.

Additionally, the invention may include the use of a gelling agent to provide a chemiluminescent composition of self-supporting structure as disclosed in copending application, Ser. No. 577,594, filed Sept. 7, 1967 and now abandoned.

The following examples are intended to illustrate the present invention and are in no way intended to limit the invention except to the extent that the appended claim is limited.

EXAMPLES I–XIII

In these examples, various fluorescers were compared in a chemiluminescent system. The examples and results are shown in Table I. The fluorescers were compared under identical conditions except for Examples IV and VI as noted in the table.

It will be seen from the table that 9,10-bis(phenylethynyl)anthracene (E.A.) is a highly efficient fluorescer, much better than all others except for rubrene, at the ingredient proportions used in the examples.

TABLE I

[Fluorescence a and chemiluminescence b data for various fluorescers]

| | Fluorescence | | Chemiluminescence | | | | | | |
|---|---|---|---|---|---|---|---|---|---|
| Examples, fluorescer | Maximum Emission wavelength (mμ) | Fluorescence efficiency | P c | Ft. Lamberts d Max.a I | Life-times, e T. ¼ | (Mins.) T. 75 A.f | Quantum yield g (Einsteins mole $^{-1}$ ×10$^2$) | Radiation capacity (Einsteins liter $^{-1}$ ×10$^4$) | Light capacity (lumen hrs. liter $^{-1}$) |
| I. 9,10 diphenyl anthracene | 430 | 0.84 | .04 | 0.21 | 64.0 | 56.3 | 6.15 | 6.15 | 1.0 |
| II. Rubrene | 565 | 0.50 | .67 | 15.58 | 27.0 | 18.8 | 19.80 | 19.80 | 54.0 |
| III. 9,10 bis (phenyl ethynyl) anthracene | 510 | 0.96 | 0.61 | 2.76 | 70.7 | 59.3 | 9.97 | 9.97 | 24.8 |
| IV. 3,9 dibenzoyl perylene h | 515 | 0.47 | 0.72 | 45.70 | 1.9 | 6.4 | 5.46 | 5.46 | 16.0 |
| V. 3,4 dibenzoyl perylene | 530 | 0.18 | 0.79 | 1.14 | 54.6 | 49.1 | 2.14 | 2.14 | 6.9 |
| VI. 3,9 bis (phenylacetyl) perylene h | 535 | 0.52 | 0.76 | 1.65 | 39.1 | 33.0 | 3.49 | 3.49 | 10.8 |
| VII. 2-(2-oxo-2H-1-benzopyran-3-yl)-naphth[1,2-d]oxazole | 495 | 0.67 | 0.55 | 0.10 | 94.9 | 108.6 | 0.54 | 0.54 | 1.5 |
| VIII. Rubicene | 555 | 0.15 | 0.71 | 32.3 | 7.7 | 10.8 | 2.52 | 2.52 | 17.9 |
| IX. 12-phthaloperinone | 560 | 0.010 | 0.66 | No emission detected. | | | | | |
| X. 2,5-diphenylfuran | 388, 367 | | | Very weak emission at 390 mμ. | | | | | |
| XI. Violanthrone | 495, 630 | 0.47 | 0.29 | fluorescer destroyed during reaction. | | | Emission max. wavelength (very weak) changed from 495 to 630 during reaction. | | |
| XII. Diindenoperylene | 560 | | | Insoluble in DMP and benzene | | | | | |
| XIII. Ovalene | 505 | | | Insoluble in DMP and benzene | | | | | | a Fluorescer concentration=6×10$^{-4}$ M in dimethyl phthalate (except to note h).
b Chemiluminescent data was obtained from reactions with 0.01 M bis (2,4,6-trichlorophenyl) oxalate, 0.025 M H$_2$O$_2$, 6.7×10$^{-2}$ M tetrabutylammonium perchlorate, and 6×10$^{-4}$ M fluorescer at 25° C.
c Photopic luminosity factor.
d Maximum brightness measured in a 1.0 cm. thick cell.
e Time during which the intensity remains above one-quarter its maximum value.
f Time required for the emission of three-quarters of the total light.
g Based on the oxalate ester.
h Low solubility of the fluorescer limiting its concentration to about 4×10$^{-4}$ M.
NOTE.—2,4-dinitro phenyl oxalate was used to obtain the chemiluminescence data

EXAMPLES XIV–XV

In these examples, 9,10-bis(phenylethynyl)anthracene and rubrene are compared under identical conditions, in a system similar to that of Examples I–XIV, except that the oxalate ester and fluorescer concentrations are higher than in the previous examples. The results are shown in Table II.

TABLE II

[Effects of bis(9,10-phenylethynyl)anthracene (E.A.) and Rubrene at High Oxalic Ester Concentration a]

| Fluorescer: | T. ¾ L. (min.) | Quantum yield (Einsteins mole $^{-1}$) |
|---|---|---|
| E.A. | 103 | 0.09 |
| Rubrene | ~3 | 0.05 |

(a) Reactions with 0.03 M bis(2,4,6-trichlorophenyl) oxalate, 0.025 M H$_2$O$_2$, 0.067 M tetrabutylammonium perchlorate, and 1.7×10$^{-3}$ M fluorescer in 39.9 volume percent benzene, 60.1 volume percent dimethylphthalate at 25° C.

While rubrene provides superior light output at 0.01 M ester concentration, as shown in Table II, Examples II and III, the instability of rubrene at 0.03 M ester concentration causes E.A. to provide superior light output. E.A., moreover, accommodates long-lived emission, while reactions with rubrene are short-lived.

EXAMPLES XVI–XXIII

In these examples, 9,10-bis(phenylethynyl)anthracene is compared to rubrene and 9,10-diphenyl anthracene in different chemiluminescent systems. The results are shown in Table III.

TABLE III

[Effects of 9,10-bis(phenylethynyl)anthracene and other fluorescers in oxalate ester and amide chemiluminescence]

| Fluorescer a | Fluorescence b quantum yield | Emission max. (mν) | Chemiluminescence quantum yield (Einsteins mole $^{-1}$) | | |
|---|---|---|---|---|---|
| | | | TCPO c | DNPO d | NPG e |
| Rubrene | 0.75 | 560 | 19.8 | 18.6 | 9.9 |
| BPEA | 0.96 | 510 | 10.0 | 15.1 | 10.3 |
| DPA | 0.84 | 430 | 6.2 | 8.0 | | a BPEA is 9,10-bis(phenylethynyl)anthracene; DPA is 9,10-diphenyl-anthracene.
b Fluorescence quantum yield in dimethyl phthalate. The rubrene value is an estimate.
c Chemiluminescent reaction of 0.01 M bis(2,4,6-trichlorophenyl) oxalate (TCPO), 0.025 M H$_2$O$_2$, 6.0×10$^{-4}$ M fluorescer. and 0.067 M tetrabutylammonium perchlorate in dimethyl phthalate (DMP) at 25°.
d Chemiluminescent reaction of 0.01 M bis (2,4-dinitrophenyl)oxalate (DNPO), 0.025 M H$_2$O$_2$, and 6.0×10$^{-4}$ in fluorescer in DMP at 25°.
e Chemiluminescent reaction of 0.01 M bis(1-[1H]-5-nitro-2-pyridonyl) glyoxal (NPG), 0.025 M H$_2$O$_2$, and 6.0×10$^{-4}$ M fluorescer in DMP at 25°.

EXAMPLES XXIV–XXXVI

In these examples, different phenylethynyl acene compounds were compared to other fluorescent compounds.

As shown in Table IV, varying unsubstituted acene compounds were compared to the same compounds when substituted with phenylethynyl groups.

The comparison was made by radiating solutions of the fluorescers with ultra-violet radiation under identical conditions and measuring the emission wavelengths and quantum yields.

It is apparent that the addition of phenylethynyl groups to a compound causes an improvement in fluorescence efficiency. The wavelength of the emission of the fluorescer is shifted to a longer wavelength, and the quantum yield of the chemiluminescent system is increased.

In Table V, the chemiluminescence efficiency of phenylethynyl acene type compounds is compared in chemiluminescent systems to other fluorescer types. It will be seen that the addition of phenylethynyl groups greatly improves the fluorescence efficiency. Such phenylethynyl acene compounds are highly efficient fluorescers. Although they are exceeded by rubrene, the phenylethynyl acenes are much more stable.

TABLE IV.—FLUORESCENCE EFFICIENCY [a]

| Compound | Maximum wavelengths (m$\mu$) | emission,[b] | Quantum yields (Einsteins/mole) |
|---|---|---|---|
| Anthracene [c] | 387 | 406 | 0.25 |
| 9,10-bis(phenylethynyl)anthracene | 490 | 513 | 0.83 |
| Naphthacene [d] | 483 | 514 | 0.21 |
| 5,12-bis(phenylethynyl)naphthacene | 578 | 616 | 0.50 |
| Pentacene [e] | 578 | | |
| 6,13-bis(phenylethynyl)pentacene | 690 | 730 | 0.10 |
| Rubrene | 565 | 595(sh) | 0.50 |
| 9,10-diphenylanthracene | 415 | 435 | 0.70 |

[a] Solvent was o-dichlorobenzene.
[b] The first band is the first (short wavelength) band and is strong in each case.
[c] Solvent was ethanol.
[d] Solvent was benzene.
[e] Too insoluble for measurement.

TABLE V.—CHEMILUMINESCENCE EFFICIENCY

| Compound | Concentration of fluorescer (10⁴) | Quantum yields,[a] Einsteins/mole | Light capacities,[b] lumen-hrs./liter |
|---|---|---|---|
| 9,10-diphenylanthracene | 33.0 | 7.89 | 1.0 |
| 9,10-bis(phenylethynyl)anthracene | 33.0 | 13.49 | 24.0 |
| Rubrene | 10.0 | 26.95 | 54.0 |
| 5,12-bis(phenylethynyl)naphthacene | 10.0 | 23.18 | [c] 25.2 |
| 6,13-bis(phenylethynyl)pentacene | 1.7 | 5.68 | [d] |

[a] Maximum observed quantum yields were determined at the fluorescer concentrations given above in the reaction of 0.001 M bis(2, 4, 6-tri chlorophenyl)oxalate (TCPO) and 0.01 M H$_2$O$_2$ with 1.7×10⁻⁴ M sodium salicylate in 87% O-dichlorobenzene and 13% t-butyl alcohol.
[b] Data obtained from reactions with 0.01 M TCPO, 0.0025 M H$_2$O$_2$, 6.7×10⁻² M tetrabutylammonium perchlorate and 6.0×10⁻⁴ M fluorescer in dimethylphthalate, except footnote c.
[c] Triton B (8.0×10⁻⁵ M) was used instead of tetrabutyl-ammonium perchlorate.
[d] 83% of emission was at wavelength greater than 700 m$\mu$.

Preparation of certain specific substituted phenylethynyl compounds is set forth in Examples XXXVII to XLII, using the method described by W. Ried, W. Donner and W. Schlegelmilch, Ber. 94, 1051 (1951).

EXAMPLE XXXVII 9,10-dihydroxy-9,10-bis(phenylethynyl)-9,10-dihydroanthracene The procedure reported by Ried and coworkers was followed. To a suspension of 11.5 g. (0.50 mole) of lithium amide in 600 ml. of anhydrous dioxane was added 51.0 g. (0.50 mole) of phenylacetylene in 100 ml. of dioxane. After the addition was completed, the mixture was heated at reflux for 2 hours. To the warm mixture was added 52.0 g. (0.50 mole) of 9,10-anthraquinone and the mixture was heated at reflux for 16 hours. The cooled mixture was treated with 1 liter of 0.5 M aqueous ammonium chloride solution. The product was filtered off and washed with water. Recrystallization from acetonitrile gave colorless crystals, M.P. 220° C. (lit. M.P. 206–207°), yield 47%.

EXAMPLE XXXIII 9,10-bis(phenylethynyl)anthacene

Five grams of 9,10-dihydroxy-9,10-bis(phenylethynyl)-9,10-dihydroanthracene was dissolved in 50 ml. of dioxane and the solution was slowly added to a solution of 10 g. of stannous chloride dihydrate in 75 ml. of 50% aqueous acetic acid. An organic solid precipitated and after stirring at room temperature for one hour it was collected by filtration. Recrystallization from benzene gave orange crystals, M.P. 250–251° C. (lit. M.P. 249–250°), 85%.

EXAMPLE XXXIX 5,12-dihydroxy-5,12-bis(phenylethynyl)-5,12-dihydronaphthacene To lithium phenylacetylide, made from 14.85 g. (0.146 mole) of phenylacetylene and 2.80 g. (0.122 mole) of lithium amide in 100 ml. of dioxane, was added 15.7 g. (0.061 mole) of 5,12-naphthacenequinone in 150 ml. of dioxane. The mixture was refluxed for 4 hours, then cooled and treated with 350 ml. of 0.5 M aqueous ammonium chloride solution. Recrystallization of the product from benzene gave 15.95 g. (57%) of colorless crystals, M.P. 216.5–218° C. (dec).

EXAMPLE XL 5,12-bis(phenylethynyl)naphthacene

To 29 g. of stannous chloride dihydrate in 200 ml. of 50% aqueous acetic acid was slowly added 14.4 g. of 5,12-dihydroxy - 5,12 - bis-(phenylethynyl)-5,12-dihydronaphthacene in 300 ml. of dioxane. The mixture was stirred at room temperature for 2 hours, then diluted to a volume of 1,500 ml. with water. Recrystallization of the crude product from benzene gave 8.1 g. (63%) of dark red-purple needles, M.P. 248° (dec.).

EXAMPLE XLI 6,13-dihydroxy-6,13-bis(phenylethynyl)-6,13-dihydropentacene

To lithium phenylacetylide, made from 10.20 g. of (0.10 mole) of phenylacetylene and 2.30 g. (0.10 mole) of lithium amide in 100 ml. of anhydrous dioxane, was added 3.08 g. (0.01 mole) of 6,13-pentacenequinone in 100 ml. of dioxane. The mixture was refluxed for 4 hours, then treated with 600 ml. of 0.5 M aqueous ammonium chloride solution. The crude product was washed with benzene, then water. Recrystallization from chloroform gave 3.47 g. (68%) of colorless solid, M.P. 230° C. (dec.).

EXAMPLE XLII 6,13-bis(phenylethynyl)pentacene

To 3.0 g. of stannous chloride dihydrate in 25 ml. of 50% aqueous acetic acid was added 1.38 g. of 6,13-dihydroxy-6,13-bis(phenylethynyl)-6,13-dihydropentacene in 90 ml. of dioxane and the mixture was stirred at room temperature for 2 hours. Dilution with water gave 1.18 g. of crude product. Recrystallization from xylene gave 0.91 g. (63%) of deep blue crystals which sublimed at 195°.

Acenes having at least four rings are new compounds and are a part of this invention.

While we have set forth certain specific embodiments and preferred modes of practice of the invention, it will be apparent that this is solely for the purpose of illustration, and that various changes and modifications may be made in the invention without departing from the spirit of the disclosure or the scope of the appended claim.

We claim:
1. A method for shifting the spectral emission of a fluorescent aromatic compound to a longer emission wavelength which comprises the chemical addition of phenylethynyl substituents to said fluorescent aromatic compound.

References Cited

UNITED STATES PATENTS 2,028,472   1/1936   Rabe.
2,071,521   2/1937   Hartmann et al.

CURTIS R. DAVIS, Primary Examiner

U.S. Cl. X.R.

252—188.3